United States Patent
Gorelik et al.

(10) Patent No.: US 9,547,874 B2
(45) Date of Patent: Jan. 17, 2017

(54) METHOD, LANGUAGE, AND SYSTEM FOR PARALLEL ALGORITHMIC TRADING AND OVERSEEING TRADING ACTIVITY

(76) Inventors: Victor Gorelik, Brooklyn, NY (US); Natalia Hanson, Brooklyn, NY (US); Alexander Fursenko, Chicago, IL (US)

(*) Notice: Subject to any disclaimer, the term of this patent is extended or adjusted under 35 U.S.C. 154(b) by 314 days.

(21) Appl. No.: 12/825,505

(22) Filed: Jun. 29, 2010

(65) Prior Publication Data
US 2011/0320335 A1    Dec. 29, 2011

(51) Int. Cl.
*G06Q 40/04* (2012.01)
*G06Q 40/06* (2012.01)
*G06Q 40/00* (2012.01)

(52) U.S. Cl.
CPC .............. *G06Q 40/04* (2013.01); *G06Q 40/06* (2013.01); *G06Q 40/00* (2013.01)

(58) Field of Classification Search
CPC .......... G06Q 40/04; G06Q 40/06; G06Q 40/00
USPC ........................................................ 705/37, 35
See application file for complete search history.

(56) References Cited

U.S. PATENT DOCUMENTS

| | | | | |
|---|---|---|---|---|
| 7,613,647 B1* | 11/2009 | Cushing | ........... | G06Q 40/04 705/37 |
| 7,840,482 B2* | 11/2010 | Singla | ........... | G06Q 40/04 705/36 R |
| 7,873,560 B2* | 1/2011 | Reich | ........... | G06Q 30/02 705/1.1 |
| 7,966,246 B2* | 6/2011 | Ingargiola | ........... | G06Q 40/00 705/35 |
| 8,788,404 B1* | 7/2014 | Christopolous | ........... | G06Q 40/00 705/38 |
| 9,038,189 B1* | 5/2015 | Stevens | ........... | G06F 21/60 726/26 |
| 2008/0243675 A1* | 10/2008 | Parsons | ........... | G06Q 40/00 705/37 |
| 2008/0256013 A1* | 10/2008 | Loveless | ........... | G06Q 40/04 706/47 |
| 2009/0119172 A1* | 5/2009 | Soloff | ........... | G06Q 30/02 705/344 |

(Continued)

OTHER PUBLICATIONS

Accrue software signs definitive agreement to acquire pilot software. (Aug. 24, 2000). Business Wire Retrieved from http://dialog.proquest.com/professional/docview/672191157?accountid=142257 on Nov. 10, 2016.*

(Continued)

*Primary Examiner* — Kito R Robinson

(57) ABSTRACT

The invention provides: methods, languages, and systems for parallel algorithmic trading of financial instruments. Each instrument of interest is included in a parallel list, in a reference list, or in both lists. Market data messages are decoded by parallel threads and converted into data series. The number of the threads is preferably equal to the number of the messages in a set of messages. A trader/market regulator selects or creates a trading/overseeing algorithm consisting of expressions based on data series extracted from the messages and on predefined functions. Some of the expressions have outputs representing buy/sell/cancel orders or have outputs aimed for overseeing trading activity. The algorithm is executed by parallel threads. The number of the threads is preferably equal to the number of the instruments in the parallel list.

2 Claims, 7 Drawing Sheets

(56) References Cited

U.S. PATENT DOCUMENTS

| | | | | |
|---|---|---|---|---|
| 2010/0017321 A1* | 1/2010 | Callaway | ............... | G06Q 40/04 |
| | | | | 705/37 |
| 2010/0174633 A1* | 7/2010 | Milne | .................... | G06Q 40/00 |
| | | | | 705/37 |
| 2011/0055067 A1* | 3/2011 | Milne | .................... | G06Q 40/04 |
| | | | | 705/37 |
| 2011/0066536 A1* | 3/2011 | Milne | .................... | G06Q 40/04 |
| | | | | 705/37 |
| 2011/0066537 A1* | 3/2011 | Milne | .................... | G06Q 40/04 |
| | | | | 705/37 |
| 2011/0066538 A1* | 3/2011 | Liberman | .............. | G06Q 40/04 |
| | | | | 705/37 |
| 2011/0264577 A1* | 10/2011 | Winbom | ................ | G06Q 40/04 |
| | | | | 705/37 |
| 2012/0259762 A1* | 10/2012 | Tarighat | .................... | G06F 8/34 |
| | | | | 705/37 |
| 2014/0143121 A1* | 5/2014 | Stevens | .................. | G06Q 40/04 |
| | | | | 705/37 |

OTHER PUBLICATIONS

NCR Worldmark Line Reaches Over $400 Million in Sales Eight Months After Introduction. (Jun. 11, 1996). PR Newswire Retrieved from http://dialog.proquest.com/professional/docview/681426395?accountid=142257 on Nov. 10, 2016.*

Cheng-Kui Gu, & Xiao-Li Dong. (2009). Dot product based time series asynchronous periodic patterns mining algorithm doi:http://dx.doi.org/10.1109/ICMLC.2009.5212536 on Nov. 10, 2016.*

* cited by examiner

METHOD, LANGUAGE, AND SYSTEM FOR PARALLEL ALGORITHMIC TRADING AND OVERSEEING TRADING ACTIVITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

COPYRIGHT NOTICE

A portion of the disclosure of this patent document contains material that is subject to copyright protection. The copyright owner has no objection to the reproduction by anyone of the patent document or patent disclosure as it appears in the Patent and Trademark Office, patent file or records, but otherwise reserves all copyrights whatsoever.

BACKGROUND OF THE INVENTION

1. Field of the Invention

The present invention relates to techniques for algorithmic trading. Particularly, the invention is directed to methods, languages, and systems for parallel algorithmic trading; it significantly enhances the ability of a trader to trade a wide set of financial instruments simultaneously and also allows market regulators to implement effective trading supervision.

2. Description of Related Art

Algorithmic or automated trading has become the most common type of trading in electronic financial markets around the world. More than ⅔ of all NYSE transactions were made electronically in 2009. Algorithmic trading relies on the speed of receiving and decoding market data messages;
making and processing trading decisions.

Thus, there is a need to increase trading functionality with hardware and software solutions available to electronic traders.

The first step of algorithmic trading—receiving and decoding market data messages—can be improved by using parallel processing of messages sent by Exchange servers. For example, U.S. Pat. No. 7,668,840 discloses a system and method for configuring plurality of processing nodes into a parallel-processing database system. U.S. Pat. No. 7,512,660 discloses message handling method based on plurality of conversation threads acting in parallel and asynchronously. A leading market data provider—Thomson Reuters—uses two 4-core Intel processors in parallel to convert market data messages into price quotes and other trading information.

However, these approaches are not satisfactory when trading activity of exchange markets reaches a million market data messages per second or higher. The resulting delays in data feed are absolutely unacceptable from trading point of view.

The second step of algorithmic trading—making and processing trading decisions—can be improved by using parallel processing as well. For example, U.S. Pat. No. 7,613,647 discloses a system for executing trades of securities based on a network of several servers. Each server is programmed with a specific trading algorithm and receives trade orders and executes them according to the trading algorithm programmed therein. U.S. Pat. No. 7,047,232 discloses a system and a method for parallelizing applications of script-driven software tools. The system has a capability of using multiple processors in parallel for substantial improvements in overall "throughput". MATLAB, SAS, and some other software products provide library functions for fast parallel computing by blocks of threads running on NVIDIA video card with hundreds of coprocessors.

However, these solutions are aimed for working with one or very few trading instruments. There is no language or system support for algorithmic trading which would deal with hundreds or thousands of the instruments simultaneously.

Another known problem in electronic trading is "gaming"—attempts to manipulate a security's price or entire market by artificially generated price swings. U.S. Pat. App. No. 20090125447 discloses a method for mitigating such effects.

However, this method is limited to a narrow problem of eliminating the price spikes. There is a need in a more general tool for anti-gaming supervision.

Accordingly, there is a need in a high performance method, a flexible language, and a powerful system for parallel algorithmic trading of thousands of financial instruments simultaneously and for overseeing of trading activity.

BRIEF SUMMARY OF THE INVENTION

Advantages of the present invention will be set forth in and become apparent from the description that follows. Additional advantages of the invention will be realized and attained by the methods, languages, and systems particularly pointed out in the written description and claims hereof, as well as from the appended drawings.

To achieve these and other advantages and in accordance with the purpose of the invention, as embodied herein, the invention includes the following method, language and system for parallel algorithmic trading.

According to the invention, each financial instrument of interest is included in a parallel list, in a reference list, or in both lists by a trader/market regulator.

Market data sources broadcast encoded market data messages reflecting trading activity in exchange markets. The proposed system receives sets of these incoming messages from market data gateways. While one set of messages is being decoded by the system, the next set of messages is being accumulated. The sets may vary in size significantly.

The market data messages relevant to the instruments of interest are being decoded by parallel threads using, for example, CUDA—Compute Unified Device Architecture developed by NVIDIA. A CUDA-enabled computer has two different units: CPU—Central Processing Unit, or host, and GPU—Graphics Processing Unit, or device. According to one embodiment of the invention, the incoming messages are put in the host memory and then copied to the device memory for parallel processing. A modern GPU contains hundreds of coprocessors; for example, a workstation "Tesla" has 960. Each coprocessor runs hundreds of threads in parallel. So, even if a set has hundreds of thousands of the messages, it is possible and preferable to have one thread to process one message.

In accordance with another aspect of the invention, trading and quote information extracted (decoded) from the messages is converted into data series specific for instruments of a union of the parallel and reference lists.

In accordance with another aspect of the invention, a trader/market regulator selects or creates an algorithm consisting of expressions based on data series extracted from the messages and on predefined functions. An algorithm created for trading purposes is referred to as a trading algorithm; an algorithm created for purposes of overseeing is referred to as an overseeing algorithm.

In accordance with another aspect of the invention, outputs of the expressions and the data series created as a result of the decoding can be inputs for the predefined functions. Some of the expressions in the algorithm have outputs representing buy/sell/cancel orders. These orders are copied into the host memory and then they are directed for an execution.

In accordance with another aspect of the invention, after all the data series are created and the algorithm is defined, a number of new threads in GPU start executing the algorithm. The number of these threads is preferably equal to the number of the instruments in the parallel list.

In accordance with another aspect of the invention, after an order is executed, a confirmation of that is being sent to the host memory, copied to the device memory, and can be used later as an input for the trading algorithm along with the data series created during the decoding.

It is to be understood that the foregoing general description and the following detailed description are exemplary and are intended to provide a further explanation of the invention claimed.

The accompanying drawings, which are incorporated in and constitute part of this specification, are included to illustrate and provide a further understanding of the method and system of the invention. Together with the description, the drawings serve to explain principles of the invention.

DETAILED DESCRIPTION OF THE INVENTION

Reference will now be made in detail to the present preferred embodiments of the invention, examples of which are illustrated in the accompanying drawings. The method and corresponding steps of the invention will be described in conjunction with the detailed description of the language and the system.

1. Method

In accordance with the invention, a method for parallel algorithmic trading is provided. The method comprises identifying financial instruments of interest, decoding market data messages related to these instruments, creating a trading algorithm in terms of the proposed language, and generating buy/sell/cancel orders in accordance with the algorithm.

Figure 1:
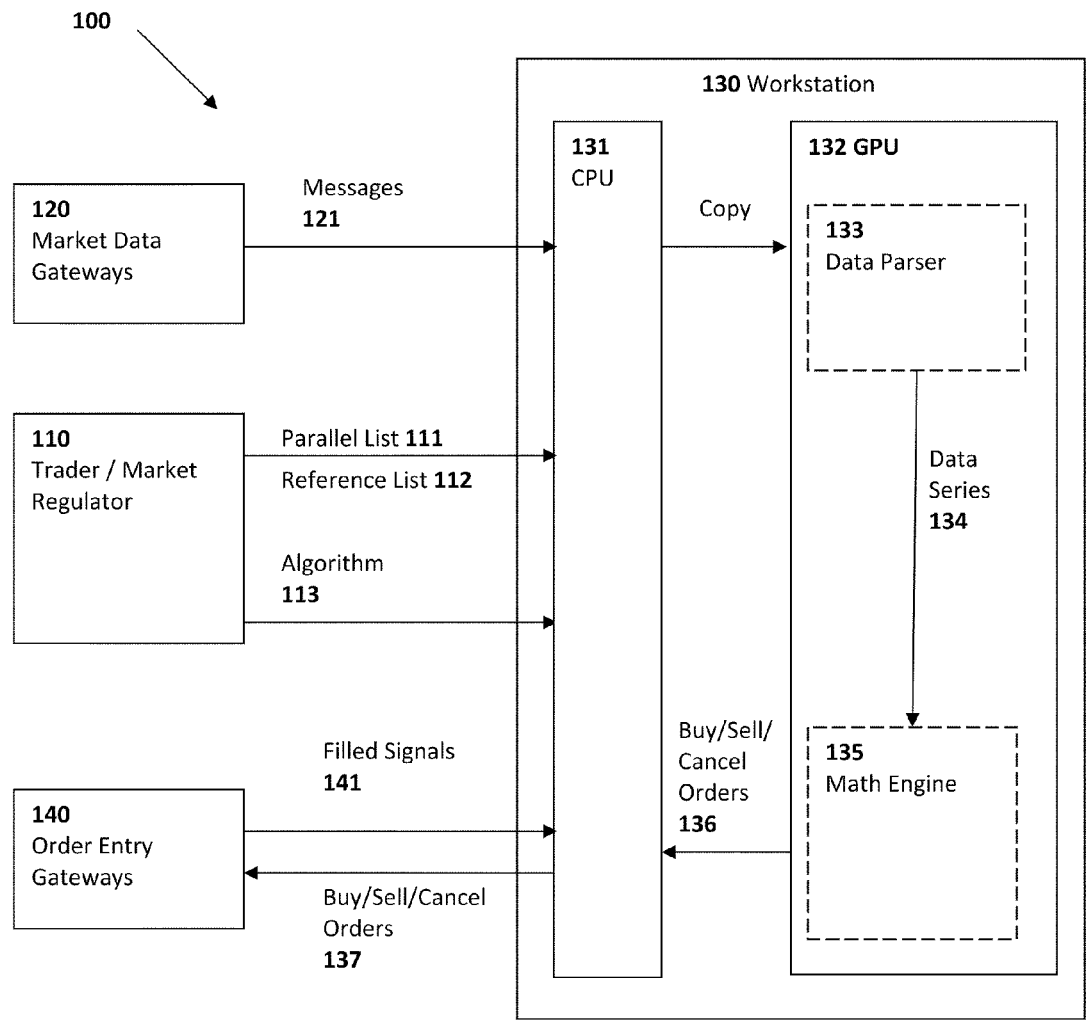
FIG. 1 is a schematic view of a process flow of an exemplary embodiment of the method, the language, and the system provided in accordance with the present invention.

For purpose of explanation and illustration, and not limitation, a diagram is presented in FIG. 1 illustrating an exemplary embodiment 100 of the method for parallel algorithmic trading in accordance with the invention. Other aspects of exemplary embodiments of methods, languages, systems, software programs, or graphical user interfaces provided in accordance with the invention are illustrated in FIGS. 2-6, as will be described.

As illustrated in FIG. 1, the method begins by Trader/Market Regulator 110 who identifies Parallel List 111 and Reference List 112 of financial instruments.

One example of such lists is a parallel list of 500 stocks of a trader's portfolio and a reference list of two indexes: SPY and QQQQ.

Another example of the lists is a parallel list of all the NASDAQ financial instruments and a reference list of all the NASDAQ indexes. In this case, an intersection of the two lists is not empty.

One more example of the lists is a parallel list of five stocks {AMAT, QCOM, JNPR, CIEN, CHKP} and an empty reference list.

As further illustrated in FIG. 1, the method for parallel algorithmic trading also includes a creation of Algorithm 113 for processing data series related to the parallel and reference lists. The source of information for the data series is Market Data Gateways 120.

As further illustrated in FIG. 1, Market Data Gateways 120 broadcast Messages 121. According to the illustrated method, Messages 121 are directed to Workstation 130 consisting of CPU 131 and GPU 132. While one set of the market data messages is being decoded by the system, the next set of the messages is being accumulated.

As further shown in FIG. 1, according to the illustrated method, the sets of Messages 121 are directed to GPU 132 and decoded by Data Parser 133 by parallel threads. The parallel decoding is achieved by using NVIDIA CUDA—Compute Unified Device Architecture.

A CUDA workstation consists of CPU and GPU. A modern GPU contains hundreds of coprocessors; for example, a workstation "Tesla" has 960. Each coprocessor runs hundreds of threads in parallel. In accordance with the illustrated method, it is preferable to have one thread to decode one message. If the number of messages in a set is greater than the number of all available threads (which is unlikely), then all available threads are used and, as a result, one thread processes more than one message.

As further shown in FIG. 1, according to the illustrated method, Data Parser 133 produces Data Series 134 for each financial instrument in both parallel and reference lists. In the exemplary method, Data Series 134 are presented as data series of "time-value" type, data series of "time-list of values" type, or data series of "value" type.

As further shown in FIG. 1, according to the illustrated method, Math Engine 135 processes the input data series according to Algorithm 113, generates Buy/Sell/Cancel Orders 136, and directs these orders to CPU 131. Buy/Sell/Cancel Orders 137 finalized at CPU are directed to Order Entry Gateways 140. According to the illustrated method, Algorithm 113 is executed by multiple threads in parallel; the number of the threads is equal to the number of the financial instruments in Parallel List 111.

As further shown in FIG. 1, according to the illustrated method, Order Entry Gateways 140 direct Filled Signals 141 (the signals confirming an execution of the orders) to Math Engine 135 (through CPU 131). These signals serve as input information for Algorithm 113 along with Data Series 134.

2. Language

According to the invention, the language has three main components:
 data series,
 predefined functions, and
 an algorithm.
 2.1 Data Series.

Data series are the basic elements of the language of the invention. They are being extracted from the Data Series 134 for further processing by Algorithm 113. According to the proposed language, there are three types of data series: data series of "time-value" type, "time-list of values" type, and "value" type.

Figure 2:
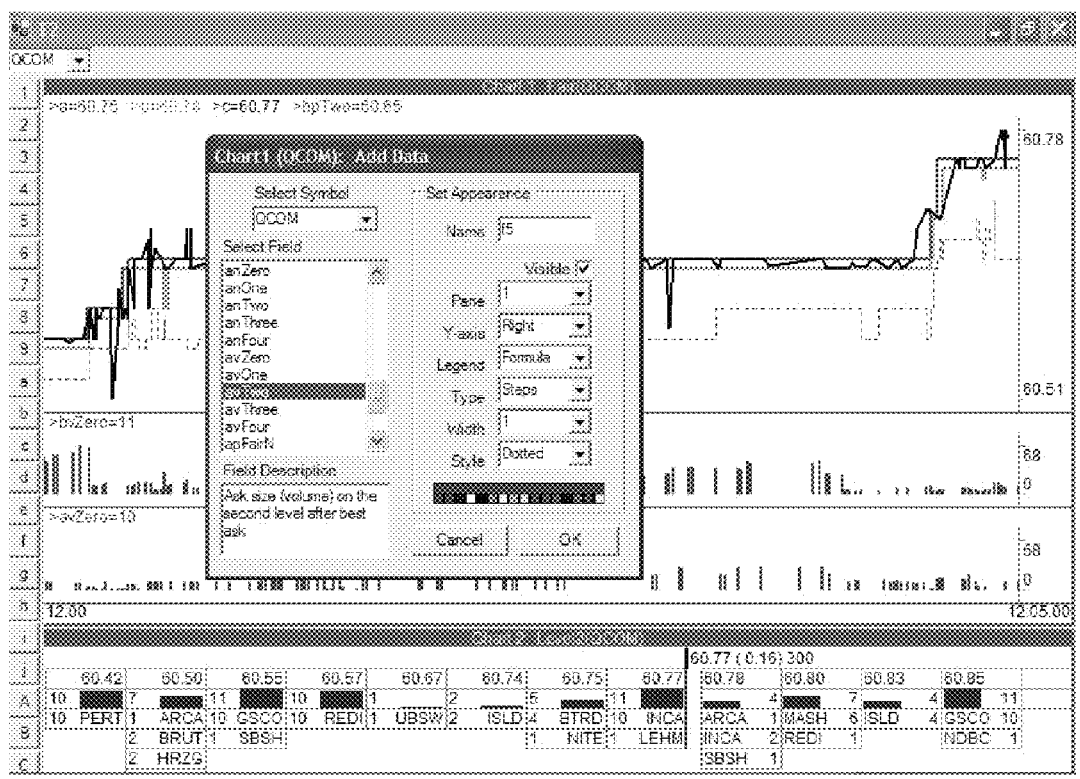
FIG. 2 is a graphical representation of data series of "time-value" type used as inputs of an algorithm for parallel trading in accordance with the present invention; the figure also illustrates a related graphical user interface.

FIG. 2 is a graphical representation of data series of "time-value" type used as inputs of an algorithm for the parallel trading in accordance with the present invention; the figure also illustrates a related graphical user interface.

The lower part of FIG. 2 (Chart 2) presents bid and ask quotes for QCOM at a particular moment of time. There are 4 levels of the ask quotes at the right part of Chart 2:
$60.80—next after best ask; i.e. ask on level One;
$60.83—next after ask on level One; i.e., ask on level Two;
$60.85—next after ask on level Two; i.e., ask on level Three.
There are also 8 levels for the bid quotes at the left part of Chart 2:
$60.77—best bid; i.e., bid on level Zero;
$60.75—bid on level One;
$60.74—bid on level Two;
and so on.
Each level of the ask price or the bid price has a list of market makers. Each list indicates how many hundreds of shares the market makers are willing to buy or to sell at this price level.

The bid and ask quotes illustrated on the lower part of FIG. 2 (Chart 2) are changing over time, reflecting changes in the quotes of different market makers. These changes can be presented as data series of type "time-value".

The upper part of FIG. 2 (Chart 1) is a graphical representation of such data series of "time-value" type used as inputs of Algorithm 113. In front of Chart 1, there is a dialog for adding new data series to the chart—one series at a time.

In accordance with the illustrated method and language, Chart 1 in FIG. 2 illustrates 6 data series of "time-value" type where "value" represents the price of QCOM during transactions (see the thick line on the first pane of Chart 1); according to the language of the invention, this data series is referred to as "c", which stands for "close";

the best ask price of QCOM (the upper step-shaped line on the first pane of Chart 1); this data series is referred to as "a", which stands for "ask";

the best bid price of QCOM (the middle step-shaped line on the first pane of Chart 1); this data series is referred to as "b", which stands for "bid";

the bid price of QCOM on level Two (the lowest step-shaped line on the first pane of Chart 1); this data series is referred to as "bpTwo", which stands for "bid price on level Two";

the size of the best bid of QCOM (a histogram on the second pane of Chart 1); this data series is referred to as "bvZero", which stands for "bid volume on level Zero".

the size of the best ask of QCOM (a histogram on the third pane of Chart 1); this data series is referred to as "avZero", which stands for "ask volume on level Zero";

According to the illustrated language, a data series of "time-value" type can have the following "value":
c—the closing price of a financial instrument during a transaction;
v—the number of shares in a transaction;
b—the best bid price of a financial instrument;
bpOne—the bid price on level One;
bpTwo, bpThree, bpFour, . . . —the bid price on the second, third, fourth, . . . bid levels;
bnZero—the number of marker makers (MM) on the level of the best bid (on level Zero) of a financial instrument;
bnOne—the number of MM on level One;
bnTwo, bnThree, bnFour, . . . —the number of MM on the second, third, fourth, . . . bid levels;
bvZero—size of the best bid; i.e., the number of shares of a financial instrument that marker makers are willing to buy at the level Zero price;
bvOne—size of the bid on level One;
bvTwo, bvThree, bvFour, . . . —size of the bid on the second, third, fourth, . . . bid levels;
a—the best ask price of a financial instrument;
apOne—the ask price on level One;
apTwo, apThree, apFour, . . . —the ask price on the second, third, fourth, . . . ask levels;
anZero—the number of MM on the level of the best ask (on level Zero) of a financial instrument;
anOne—the number of MM on level One;
anTwo, anThree, anFour, . . . —the number of MM on the second, third, fourth, . . . ask levels;
avZero—the size of the best ask; i.e., the number of shares of a financial instrument that marker makers are willing to sell at the level Zero prices;
avOne—the size of the ask on level One;
avTwo, avThree, avFour, . . . —the size of the ask on the second, third, fourth, . . . ask levels;
bT—time from a bid order is generated until the order is filled;
aT—time from an ask order is generated until the order is filled;
e—an expert's estimate of importance of a news event relevant to a financial instrument (e.g., from −10 to 10);

Calculated combinations of the above values also can be used as a "value" in data series of "time-value" type.

According to the language, another type of data series is "time-list of values" type.

According to the illustrated method and language, data series extracted from Data Series 134 can be data series of "time-list of values" type where the "list of values" is associated with a time interval.

Figure 3:
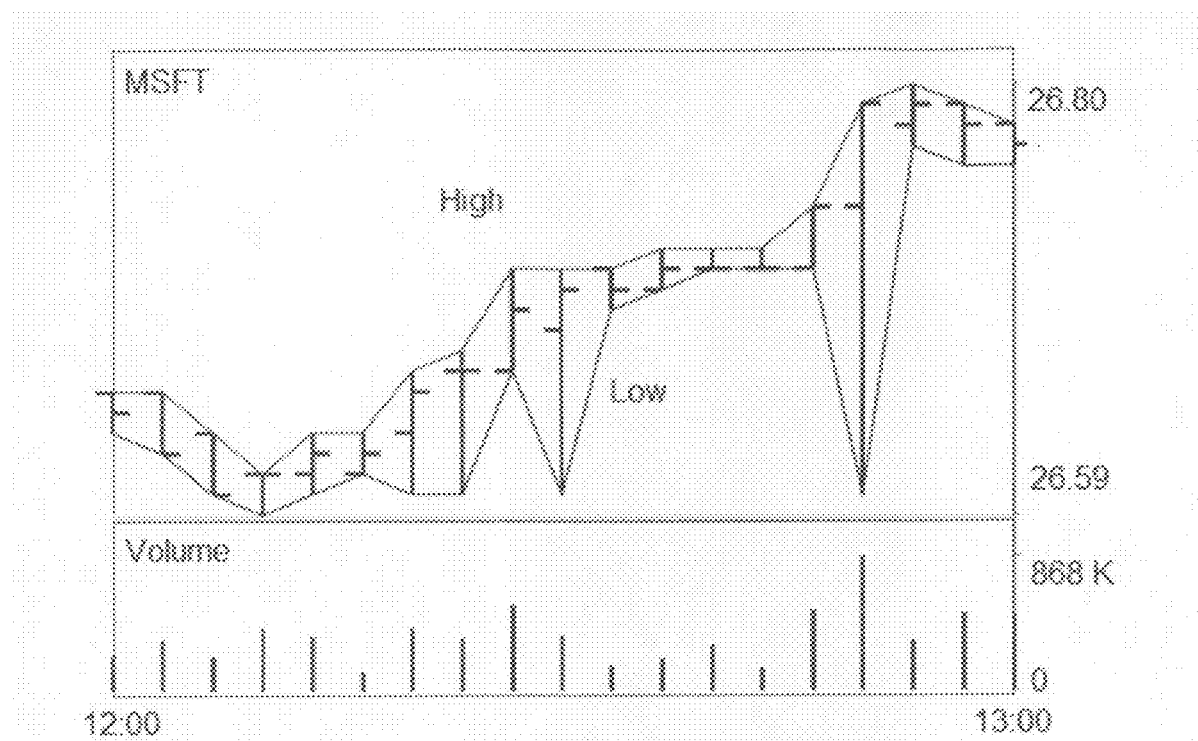
FIG. 3 is a graphical representation of data series of "time-list of values" type used as inputs of an algorithm for parallel trading in accordance with the present invention.
Figure 4:
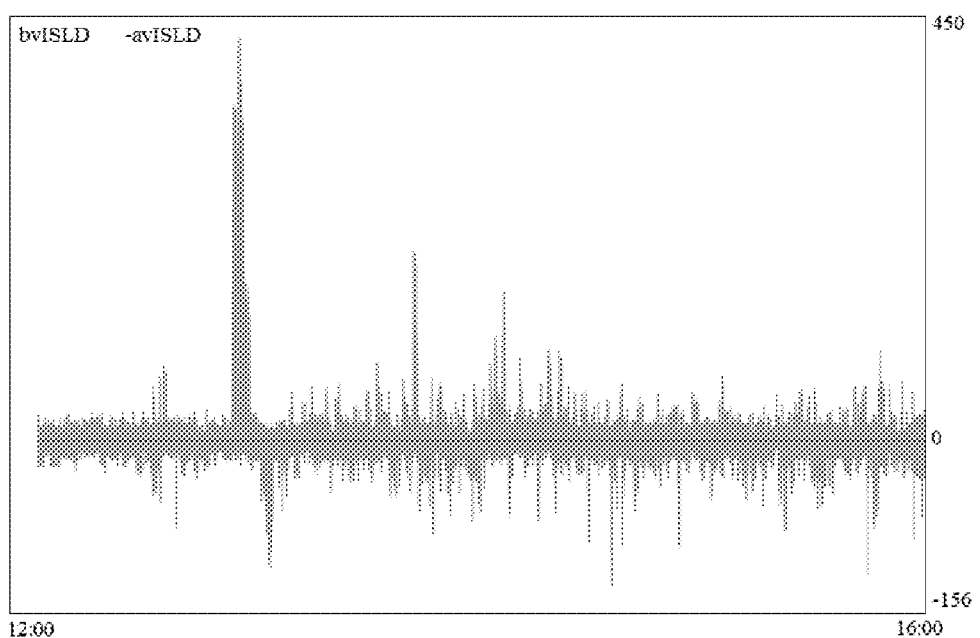
FIG. 4 is a graphical representation of data series of "time-value" type specific for a particular market maker in accordance with the present invention.

FIG. 3 is a graphical representation of data series of "time-list of values" type used as inputs of an algorithm for the parallel trading in accordance with the present invention.

For the data series in FIG. 3, a time interval is equal to 5 minutes, and a "list of values" includes:

the highest price of MSFT during the time interval (the upper line on the first pane of the chart in FIG. 3); according to the language of the invention, this data series is referred to as "h", which stands for "high";

the lowest price of MSFT during the time interval (the lower line on the first pane of the chart); this data series is referred to as "1", which stands for "low");

the opening price of MSFT during the time interval ("o", which stands for "open"; it is shown as the left short horizontal mark on the price bars);

the closing price of MSFT during the time interval ("c", which stands for "close"; it is shown as the right short horizontal mark on the price bars);

the total number of shares of MSFT in all transactions during the time interval (a histogram on the second pane of the chart); this data series is referred to as "v", which stands for "volume".

Calculated combinations of values associated with a time interval are also can be used as a "value" in a "list of values" in data series of "time-list of values" type.

One more type of data series, according to the language, is a sequence of "value" type. According to the illustrated method and language, all data series of "value" type have the same time origin (e.g., 9:30 AM) and the same time interval (e.g., 5 minutes). Each data series of "value" type is defined as a sequence of values. For example, if a time interval is equal to 5 minutes and an origin is 9:30 AM, then a sequence {2, 101, 102, 103, 104, . . . } is equivalent to the data series shown in the table below (except the fact that the sequence takes less memory than the data series).

| time | c |
|---|---|
| 9:40 | 101 |
| 9:45 | 102 |
| 9:50 | 103 |
| 9:55 | 104 |
| . . . | . . . |

The first value in the sequence is a time shift of the sequence relative to the time origin measured in the units of the time interval. If a sequence consists of the only one value, then it is considered as a constant equal to this value.

According to the illustrated method and language, any input data series for Algorithm 113 can be specified for each market marker individually. For example, for a market maker ISLD, vInISLD is the number of shares bought by ISLD;
pInISLD is the price of shares bought by ISLD;
vOutISLD is the number of shares sold by ISLD;
pOutISLD is the price of shares sold by ISLD;
bISLD is the best bid of ISLD;
bvISLD is the size of the best bid of ISLD (shown as positive histograms in FIG. 4);
aISLD is the best ask of ISLD;
avISLD is the size of the best ask of ISLD (shown as negative histograms in FIG. 4).

This feature of the language can be used for gaming by traders and brokers. On the other hand, the feature makes gaming more transparent and, hence, traceable. So, it gives market regulators an opportunity to track a trading activity of any market maker.

2.2 Predefined Functions.

Another part of the language is predefined functions.

The illustrated language includes a set of predefined functions having data series as their input arguments. The following examples illustrate functions of data series of "time-list of values", "value", and "time-value" types.

A table below illustrates a predefined function sqrt(c) of a data series "time-list of values" type.

| time | c | sqrt(c) |
|---|---|---|
| 10:25 | 1 | 1 |
| 10:30 | 16 | 4 |
| 10:35 | 9 | 3 |
| 10:40 | 25 | 5 |
| . . . | . . . | . . . |

The function sqrt(c), in this case, uses value "c" from the "list of values". The same function sqrt( ) can be used to calculate square root of any value from the list, e.g., sqrt(h) applies to "high" prices.

The next table illustrates a predefined function sma(c, 3)—a simple moving average of three previous (including current) closing prices.

| time | c | sma(c, 3) |
|---|---|---|
| 9:30 | 101 | |
| 9:35 | 102 | |
| 9:40 | 103 | 102 |
| 9:45 | 104 | 103 |
| 9:50 | 105 | 104 |
| . . . | . . . | . . . |

The data series "c" and the function sma(c, 3) shown in the table above can also be presented as sequences of values (data series of "value" type):

c={0, 101, 102, 103, 104, 105, . . . },
sma(c, 3)={2, 102, 103, 104, . . . };

where the first term in the sequence "c" is equal to 0, which indicates that this sequence is not shifted relative to the time origin. The first term in the sequence sma(c, 3) is equal to 2, which means that this sequence is shifted relative to the time origin by 2*5=10 minutes where 5 is the time interval.

The next table illustrates a predefined function (c+c1) of two data series—c and c1. The function performs adding two data series of "time-value" type where time is presented by its ID.

| Time ID | c | c1 | c + c1 |
|---|---|---|---|
| 1 | 20 | | |
| 2 | | 100 | 120 |
| 3 | | 101 | 121 |
| 4 | 21 | | 122 |
| 5 | 22 | | 123 |
| 6 | | 102 | 124 |
| . . . | . . . | . . . | . . . |

According to the illustrated language,
the notation "c" refers simultaneously to all data series of financial instruments included in a parallel list, i.e., a list for parallel calculations;

c1 refers to the first financial instrument in a reference list, i.e., a list for reference calculations;
c2 refers to the second financial instrument in a reference list;
c3 refers to the third, and so on.

The same rule applies to all names of data series: v, b, a, bpOne, bpTwo, and so on; i.e., names without index refer to all financial instruments in a parallel list, names with index i refer to the i-th financial instrument in a reference list.

The following table illustrates the result of a function (c+c1) where a list for parallel calculations is {AMAT, QCOM, JNPR} and a list for reference calculations is {QQQQ}.

| Time ID | c |  |  | c1 | c + c1 |  |  |
|---|---|---|---|---|---|---|---|
|  | AMAT | QCOM | JNPR | QQQQ | AMAT | QCOM | JNPR |
| 1 | 20 |  |  |  |  |  |  |
| 2 |  | 40 |  |  |  |  |  |
| 3 |  |  |  | 100 | 120 | 140 |  |
| 4 |  | 60 |  |  |  |  | 160 |
| 5 |  | 61 |  |  |  |  | 161 |
| 6 |  | 41 |  |  |  |  | 141 |
| 7 | 21 |  |  |  |  | 121 |  |
| 8 |  |  |  | 101 | 122 | 142 | 162 |
| 9 |  |  |  | 102 | 123 | 143 | 163 |
| 10 | 22 |  |  |  |  | 124 |  |
| 11 |  | 42 |  |  |  |  | 144 |
| ... | ... | ... | ... | ... | ... | ... | ... |

The result of the function (c+c1) is the three data series presented in the last three columns of the table.

2.3 Algorithm.

The important part of the language of the invention is a trading/overseeing algorithm.

According to the invention, such an algorithm consists of expressions based on data series and predefined functions. An example of an expression is $$A = sma(c, 3)$$

where A is the name of the resulting data series. Any sequence of letters can be used for names of the resulting series. Any resulting series can be used as an argument of predefined functions in subsequent expressions, for instance, $$B = sma(A, 5)$$

which calculates a simple moving average of a simple moving average.

| Time ID | c | A = sma(c, 3) | B = sma(A, 5) |
|---|---|---|---|
| 1 | 101 |  |  |
| 2 | 102 |  |  |
| 3 | 103 | 102 |  |
| 4 | 104 | 103 |  |
| 5 | 105 | 104 |  |
| 6 | 106 | 105 |  |
| 7 | 107 | 106 | 104 |
| 8 | 108 | 107 | 105 |
| 9 | 109 | 108 | 106 |
| ... | ... | ... | ... |

According to the illustrated language, nested expressions are also allowed, e.g., $$C = c + sma(B - A, 7)/(B + h1)$$

According to the invention, an algorithm consists of one, two, or more parts. Each part is associated with one chart. Expressions in each part have outputs associated with a time interval specific for each part, i.e., with a frequency specific for each part. For example, all outputs of Part 1 of an algorithm have a 5-minute frequency; and all outputs of Part 2 have a daily frequency. At the same time, inputs of expressions of the algorithm can also be associated with different frequencies. For example, if an expression $$R = c/sma(c.2, 3)$$

belongs to Part 1 of the algorithm, then the output R has the 5-minute frequency. However, the input c.2 has the daily frequency because an extension 0.2 means "the frequency of Part 2 of the algorithm". The input c has the 5-minute frequency because it does not have any extension, which means that the frequency of the input c is equal to the frequency of the output of the expression. The expression indicates that the closing price at the end of every 5-minute interval is divided by a simple moving average of the closing prices of three previous days.

According to the invention, some of the expressions have outputs representing buy/sell/cancel orders or have outputs aimed for overseeing trading activity.

A trader/market regulator can create an algorithm himself or select an algorithm out of a set of predefined algorithms provided by the invention.

3. System

According to the invention, each instrument of interest is included in a parallel list, in a reference list, or in both lists. It is done by a trader/market regulator with the help of the graphical user interface provided by the invention.

Market data messages relevant to the instruments of interest are being decoded by parallel threads and converted into data series. The number of the threads is preferably equal to the number of messages in a set of messages.

According to the invention, a trader/market regulator selects or creates a trading/overseeing algorithm consisting of expressions based on data series extracted from the messages and on predefined functions. The algorithm is executed by parallel threads. The number of the threads is preferably equal to the number of the instruments in the parallel list.

According to the illustrated method, language, and system for parallel algorithmic trading, the calculations of the algorithm have to be resumed after a new portion of market data messages relevant to the instruments of interest ("updates") is received. To optimize performance, calculation schemes have been created for each predefined function. In some cases, like a simple addition of data series, an update is performed only for new data points; the results for previously calculated points are kept unchanged. In other cases, like Fourier transforms, each point of the resulting series is changed after an update and has to be recalculated; however, even in these cases some intermediate results, like partial sums, can be reused.

In accordance with one embodiment of the invention, a software program has been implemented to carry out parallel algorithmic trading. A software program embodying the advantages herein is preferably implemented as a feature in a larger software program or suite relating to financial data. By way of further example, such a program may also be implemented as a stand-alone application that processes real-time or recorded input data in order to create and to test algorithms for parallel trading/overseeing.

In accordance with one implementation, an application for parallel algorithmic trading is available at the desk platform created by the authors of the invention; in accordance with another implementation, the application is available online at website created by the authors of the invention.

4. Examples

Example 1

Software Implementation: Algorithm 113

Figure 5:
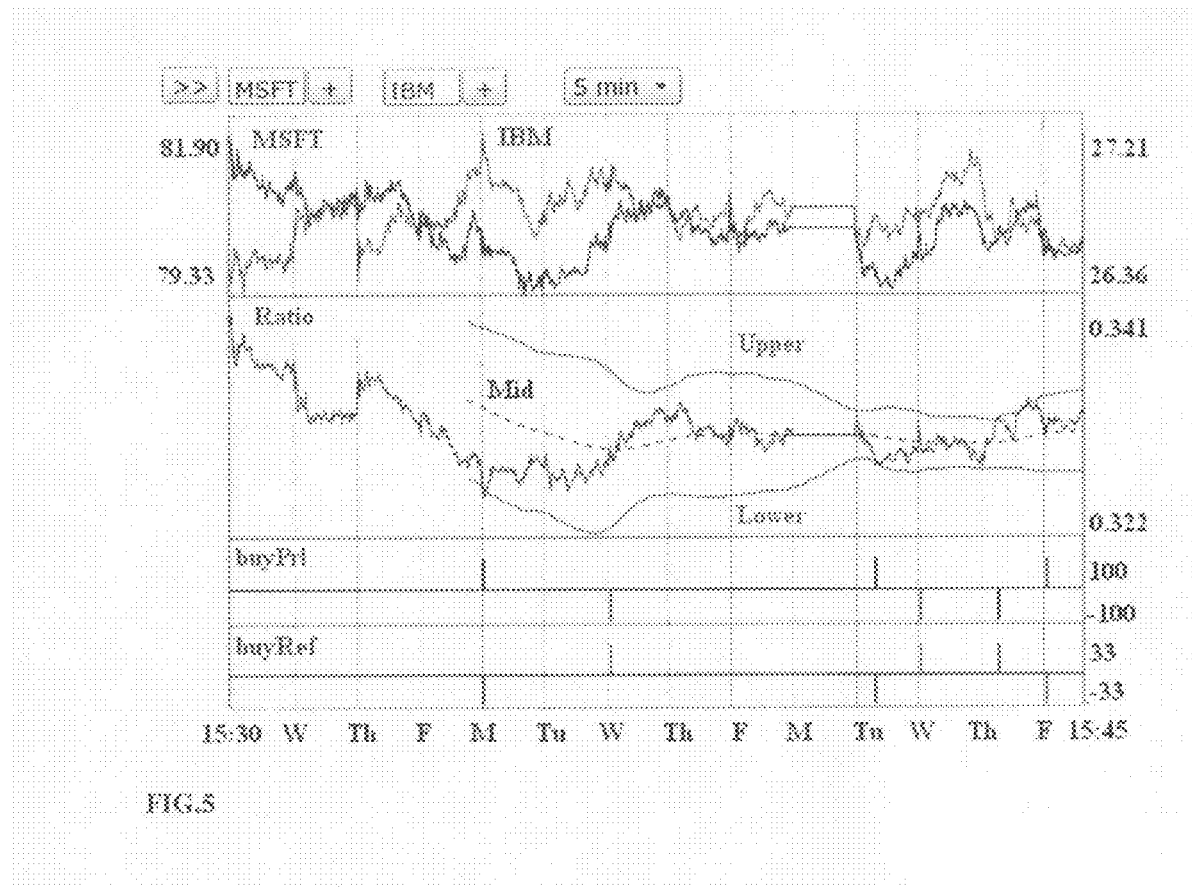
FIG. 5 is a graphical representation of the results of an algorithm for parallel trading in accordance with the present invention.

FIG. 5 is a graphical representation of calculations according to the following algorithm consisting of six expressions:

$$Ratio=c/c1$$

$$Upper=eBB(Ratio,300,2.5)$$

$$Mid=eBB(Ratio,300,0)$$

$$Lower=eBB(Ratio,300,-2.5)$$

$$buyPrl=100*orderM(Ratio,Mid,Upper,Lower,3)$$

$$buyRef=-Ratio*buyPrl$$

The output graphics in FIG. 5 are created for MSFT and IBM where MSFT is one of several financial instruments included into a parallel list and IBM is the only instrument in a reference list.

The price series of MSFT (denoted in the algorithm as c) and of IBM (denoted as c1) are shown on the first pane of the chart in FIG. 5.

The output of the expression $$Ratio=c/c1$$

is shown on the second pane of the chart in FIG. 5.

The Bollinger Bands outputs:

$$Upper=eBB(Ratio,300,2.5)$$

$$Mid=eBB(Ratio,300,0)$$

$$Lower=eBB(Ratio,300,-2.5)$$

are shown on the second pane of the chart in FIG. 5 as well. The predefined function eBB(Ratio, 300, 0) calculates an exponential moving average of the series Ratio. The second parameter (300) is the number of previous (including current) points used in the calculation. The third parameter of a function eBB( ) is the number of standard deviations added to an exponential moving average. It is equal to 0 in the expression Mid, 2.5 in Upper, and (−2.5) in Lower.

The output of the expression $$buyPrl=100*orderM(Ratio,Mid,Upper,Lower,3)$$

is buy/sell orders for the financial instruments included into the parallel list; in this case—MSFT. The output is shown on the third pane of the chart in FIG. 5. In this case, the predefined function orderM( ) has five arguments: four series (Ratio, Mid, Upper, and Lower) and a stop-loss parameter, which is equal to 3. When Ratio goes below Lower, then the output of the orderM( ) becomes equal to 1 (means buy). When Ratio returns back to Mid level and exceeds it, then the output of the orderM( ) becomes equal to −1 (means sell). And vice versa: when Ratio goes above Upper, then the output of the orderM( ) becomes equal to −1 (means sell). When Ratio returns back to Mid level and goes below it, then the output of the orderM( ) becomes equal to 1 (means buy).

According to the algorithm, if Ratio goes too far from Mid—more than 3 standard deviations (3 is the stop-loss parameter), then an open position should be closed. The orderM( ) becomes equal to 1 in case of Ratio>Mid; and the orderM( ) becomes equal to −1 in case of Ratio<Mid. The coefficient 100 in the expression indicates the number of MSFT shares to buy or to sell.

According to the algorithm of the current example, the buy and sell orders for the financial instrument included into the reference list—IBM are opposite to the orders for the instrument included into the parallel list—MSFT ("buy MSFT" implies "sell IBM" and "sell MSFT" implies "buy IBM"):

$$buyRef=-Ratio*buyPrl.$$

The coefficient Ratio guarantees that amount of money spent on IBM is equal to amount of money spent on MSFT, i.e., allows creating so-called "neutral portfolio". The output buyRef is shown on the fourth pane of the chart in FIG. 5.

A predefined function orderM( ) is one of many other predefine functions, which generate orders. For example, a predefined function $$orderL(Ratio,Mid,Upper,Lower,3,Price1,Price2)$$

generates limit orders: if it is a buy order, then the price of an open position should not be higher than Price1, if it is a sell order, than the price should not be lower than Price2. The output of a function generating orders is a series of "time-list of values" type. For a function orderM( ) the list of output values consists of only one value: 1, 0, or −1. For the function orderL( ) the list of values has additional values specifying the limits of the generated buy/sell price. The letter M in orderM( ) stands for "market"; the letter L in orderL( ) stands for "limit".

Another example of a predefined function generating limit buy/sell orders is orderL(Ratio, Mid, Upper, Lower, 3, Price1, Price2, conf, 1000).

This function has two more arguments: a series conf, which is a confirmation signal received through Order Entry Gateways 140, and a waiting time (1000 milliseconds). If a confirmation signal for a limit order has not been received 1000 milliseconds after an order, then the function orderL( ) generates the order cancellation.

A dialog for creating a list of financial instruments for parallel calculations is available by clicking the button "+" next to the "msft" input box shown at the top in FIG. 5. A dialog for creating a list of financial instruments for reference calculations is available by clicking the button "+" next to the "ibm" input box shown at the top in FIG. 5 as well.

Figure 6:
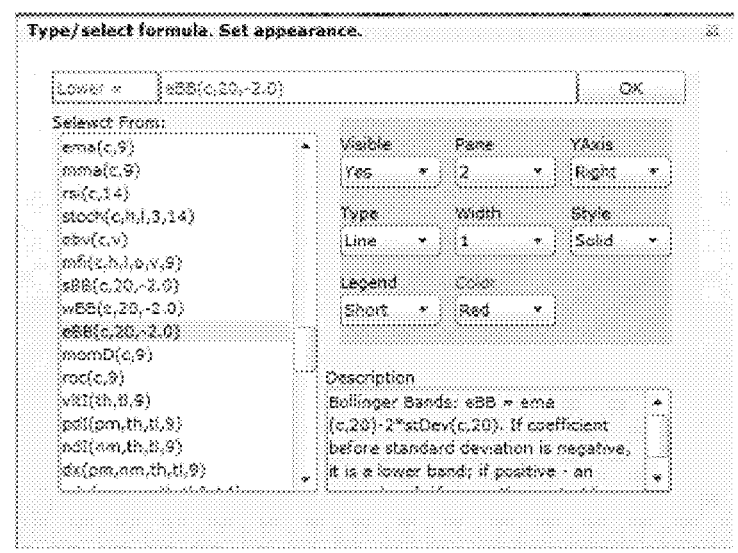
FIG. 6 is a graphical user interface for creating an algorithm for parallel trading in accordance with the present invention.

A dialog for creating expressions of an algorithm is shown in FIG. 6. It is available by clicking button ">>" shown at the top left corner in FIG. 5. The dialog allows a trader/market regulator to specify a name of the expression and to construct the expression itself. There is also a set of buttons for presentation purposes.

Example 2

Software Implementation: Back-Testing of Algorithm 113

Figure 7:
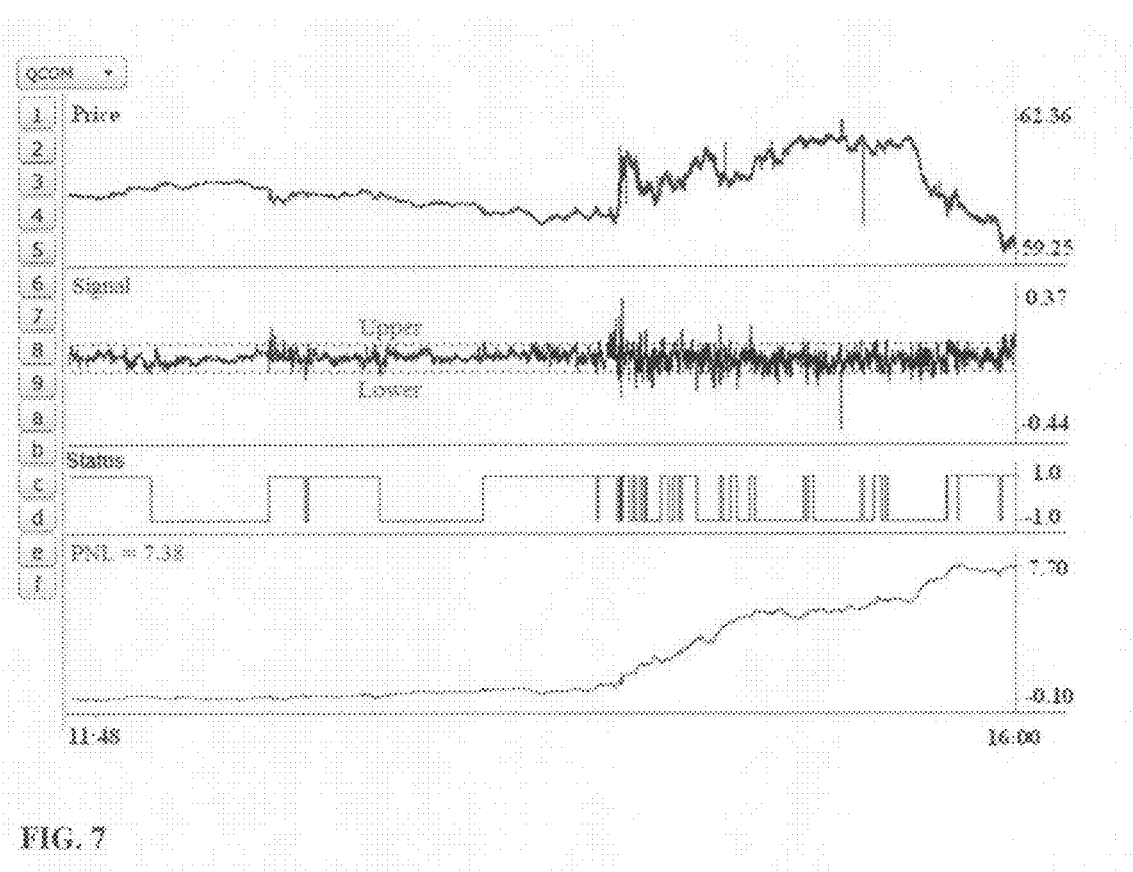
FIG. 7 is a graphical representation of back-testing of an algorithm for parallel trading in accordance with the present invention.

FIG. 7 is a graphical representation of back-testing of another Algorithm 113:

$$Price=c$$

$$Signal=2*pFairN-b-a$$

Lower=−b/700

Upper=b/700

Status=comp2(Lower,Upper,Signal)

PNL=profit(b−0.01,a+0.01,Status)

The series Price=c of the instrument QCOM is shown on the first pane of the chart in FIG. 7.
The series Signal=2*pFairN−b−a is shown on the second pane of the chart in FIG. 7. The data series pFairN represents a fair price weighted on five bid/ask levels by number of market makers:

$$pFairN=(b_4*bM_4+b_3*bM_3+b_2*bM_2+b_1*bM_1+\\b_0*bM_0+a_4*aM_4+a_3*aM_3+a_2*aM_2+a_1*aM_1+\\a_0*aM_0)/[2*(bM_4+bM_3+bM_2+bM_1+bM_0+aM_4+\\aM_3+aM_2+aM_1+aM_0)],$$

where
$bM_i$ is the number of market makers on i-th level of a bid;
$aM_i$ is the number of market makers on i-th level of an ask;
$b_i$ is the bid price on i-th level of a bid;
$a_i$ is the ask price on i-th level of an ask.
If bids and asks were symmetrical, then pFairN would be equal to (a+b)/2 and Signal=2*pFairN−b−a would be equal to 0. If there are more market makers willing to buy than to sell, then Signal>0; and if there are more market makers willing to sell than to buy, then Signal<0.

The series Upper=b/700 (the upper horizontal line) and Lower=−b/700 (the lower horizontal line) are shown on the second pane of the chart in FIG. 7.

The series Status=comp2(Lower, Upper, Signal) is shown on the third pain of the chart in FIG. 7. The predefined function comp2( ) has three input arguments: the data series Lower, Upper, and Signal. When Signal becomes greater than Upper, then comp2( )=1 (means "take a LONG position"); when Signal becomes less than Lower, then comp2( )=−1 (means "take a SHORT position"), and so on. As a result, when Status=1, a trader is in LONG position; when Status=−1, a trader is in SHORT position.

The series PNL=profit(b−0.01, a+0.01, Status) is shown on the fourth pain of the chart in FIG. 7. The predefined function profit(b−0.01, a+0.01, Status) calculates profit and losses in an assumption that a trader has only one share in SHORT or LONG position, and that the price to buy one share is equal to the ask price plus 1 cent; and the price to sell one share is equal to the bid price minus 1 cent, which is a commission fee.

According to FIG. 7, use of the illustrated algorithm generates a profit of $7.38 (this value is shown as a part of the legend on the fourth pane) after 4 hours of trading of one share of QCOM (priced around $60, see the right Y-axis at the first pane). The worst profit is $−0.10, and the best profit is $7.70 (shown on the right Y-axis of the third pane).

Changing a selection in the top left combo box in FIG. 7 allows a trader to get a similar chart and statistics for any financial instrument in the parallel list other than QCOM.

Clicking any button at the column of the buttons at the left side in FIG. 7: 1, 2, 3 . . . C allows a trader to load one of predefined algorithms. The algorithm in the EXAMPLE 2 corresponds to the button 3.

5. ADVANTAGES OF THE INVENTION

The rest of the specification describes advantages of specific aspects of the invention.

The presented examples are intended to be used by market traders for building various trading algorithmic strategies to generate consistent returns and maximize profits. The invention is also anticipated to be used by market regulators. The solutions offered by the invention, such as built-in predefined functions and ability to create overseeing algorithms are important advantages in financial market supervision in comparison with other known methods.

Market regulators can build a variety of algorithms to identify and prevent future market swings. The goal of using algorithms for market regulators is not profit and loss of a trading system, but other characteristics, e.g. quote volatility of a particular market maker.

Another example of important characteristics, for market regulators, is the number of shares bought and the number of shares sold by a market maker during a time period. If these two numbers are relatively big and close to each other, and the time interval is relatively small, then this market marker is probably involved in heavy gaming activity.

Another advantage of the invention is high performance of calculations due to embedded parallelism.

In accordance with the method of the invention, an algorithm is being executed using as many parallel threads, as there are financial instruments in a list for parallel calculations. A code for the calculations runs on the device (GPU); see FIG. 1. Intermediate data series being used in the algorithm are created in the device memory (GPU), operated on by the device, and destroyed without ever being mapped by the host (CPU) or copied to the host memory. Only data series related to orders are copied to the host memory as it is shown in FIG. 1. It dramatically minimizes data transfer between the host and the device: orders are being generated very rarely (one order in 5-10 minutes for an instrument) in comparison with the number of transactions and the number of changes in quotes (hundreds per second) for the same instrument. Calculations on the host are limited to finalizing of orders, for example, to exclude opposite orders: when an instrument in a reference list (IBM) is ordered to buy (for a pair MSFT-IBM) and, at the same time or almost at the same time, to sell (let us say for a pair DELL-IBM).

If a list for parallel calculations consists of the only one financial instrument, Algorithm 113 works similarly to algorithms of other scripting languages keeping important advantages of the invention: references to different frequencies in the same algorithm, ability to trace particular market makers, and built-in language support for buy/sell/cancel orders.

If a list for parallel calculation consists of more than one instrument, then, according to invention, the number of threads for the calculations has to be equal at least to the number of the instruments in the list. If an algorithm contains some special kinds of predefined functions, for example, functions dealing with big matrixes, then it makes sense to use not exactly one thread per instrument, but as many threads as it is needed to accelerate calculations. This approach guarantees significantly higher performance of calculations compared to known methods.

If an algorithm is empty, then the proposed system works just as Data Parser 133. On the other hand, if an algorithm is not empty and there is some other source of data series, then the proposed system works just as Math Engine 135.

All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Block diagrams and other representations herein represent conceptual views of illustrative circuitry and software embodying the principles of the invention. Thus, the functions of the various elements shown in the Figures may be provided through the use of dedicated hardware as well as hardware capable of executing software in association with appropriate software. Examples of implementation of parallelism include at least two different approaches: CUDA and cloud computing. In case of CUDA approach, functions of various elements of the invention may be implemented by, for example, workstation ServMax PSC-2n (AMAX), which has Central Processing Unit (CPU) and Graphics Processing Unit (GPU).

Central Processing Unit (CPU):
 supports two 32 nm Intel® Xeon® processor Westmere-EP 5600 series, with up to six cores & 12 threads, and 12 MB L2 cache per processor.

Graphics Processing Unit (GPU):
 up to four Tesla processors (240 computing cores per processor, 960 cores total);
 delivers up to four teraflops in a tower chassis;
 IEEE 754 single & double floating point precision;
 up to 16 GB dedicated memory (organized as 4.0 GB per GPU);
 up to 4×512-bit GDDR3 memory interface (organized as a 512-bit interface per GPU);
 up to 408 GB/sec memory bandwidth (102 GB/s per GPU to local memory).

Other hardware, conventional and/or custom, can also be used.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

Similarly, it will be appreciated that the system flows described herein represent various processes which may be substantially represented in computer-readable medium and so executed by a computer or processor/coprocessors, whether or not such computer or processor/coprocessors is explicitly shown. Moreover, the various processes/coprocessors can be understood as representing not only processing and/or other functions but, alternatively, as blocks of program code that carry out such processing or functions.

The methods, languages and systems of the present invention, as described above and shown in the drawings, provide for methods, languages, systems, computer programs and graphical user interfaces that provide superior functionality with respect to those of the prior art. It will be apparent to those skilled in the art that various modifications and variations can be made in the various illustrated embodiments of the present invention without departing from the spirit or scope of the invention. Thus, it is intended that the present invention includes modifications and variations that are within the scope of the appended claims and their equivalents.

The invention claimed is:

1. A method for parallel algorithmic trading and overseeing trading activity, running on a central processor and on a number of general processor cores, comprising:
 1.1) identifying a list of financial instruments for parallel calculations;
 1.2) identifying a list of financial instruments for reference calculations;
 1.3) determining a union of the list (1.1) and the list (1.2);
 1.4) receiving a set of market data messages through the central processor;
 1.5) extracting trading and quote information from the set (1.4) into data series corresponding to the financial instruments of the union (1.3) by using, in parallel, a number of general processor cores that is preferably equal to the number of messages in the set (1.4);
 1.6) formulating an algorithm for processing the data series (1.5);
 1.7) generating buy/sell/cancel orders according to the algorithm (1.6) by using, in parallel, a number of general processor cores that is preferably equal to the number of financial instruments in the list (1.1);
 1.8) sending through the central processor the orders (1.7) to order entry gateways;
 1.9) receiving through the central processor signals confirming an execution or a cancellation of the orders (1.7);
 1.10) using the signals (1.9) along with the data series (1.5) as inputs for the algorithm (1.6);
 1.111 updating the results of calculations of the steps (1.51 and (1.71 on receiving each new set of messages (1.4); and
 1.112 wherein inputs of the algorithm (1.6) include the data series (1.5) that are specific for particular market makers.

2. A system for parallel algorithmic trading and overseeing trading activity comprising means for performing the steps described in claim 1.

* * * * *